United States Patent [19]

Louw

[11] Patent Number: 5,692,863

[45] Date of Patent: Dec. 2, 1997

[54] SELF-LOCKING PRELOAD CONTROLLING NUT

[75] Inventor: John A. Louw, Rancho Palos Verdes, Calif.

[73] Assignee: Fairchild Fasteners-U.S., Torrance, Calif.

[21] Appl. No.: 591,036

[22] Filed: Jan. 25, 1996

[51] Int. Cl.$^6$ .............................. F16B 31/00; F16B 19/00
[52] U.S. Cl. ........................... 411/3; 411/361; 411/937.2
[58] Field of Search .................................... 411/1–5, 277, 411/361, 937.2

[56] References Cited

U.S. PATENT DOCUMENTS

| | | |
|---|---|---|
| 4,260,005 | 4/1981 | Stencel ........................ 411/3 |
| 4,383,353 | 5/1983 | Stencel ........................ 29/517 |
| 4,544,312 | 10/1985 | Stencel ........................ 411/3 |
| 4,682,520 | 7/1987 | Gray ............................ 81/471 |
| 5,061,132 | 10/1991 | Cosenza ...................... 411/3 |
| 5,092,726 | 3/1992 | Wheeler et al. ............ 411/277 |
| 5,148,727 | 9/1992 | Williamson ................ 411/3 X |
| 5,452,974 | 9/1995 | Binns ........................... 411/3 |

*Primary Examiner*—Neill R. Wilson
*Attorney, Agent, or Firm*—Christie, Parker & Hale, LLP

[57] ABSTRACT

A self-locking internally threaded nut has a deltoid shaped locking section having circumferentially spaced protrusions. The protrusions form a surface adapted to be engaged by a deltoid driver which tightens the nut onto a bolt to a predetermined axial load. At the predetermined load the protrusions are plastically deformed inwardly on the nut so that the driver rotates freely on the nut. When the protrusions are inwardly deformed, the deformed material impinges on the bolt, thereby rotationally locking the nut on the bolt.

24 Claims, 1 Drawing Sheet

U.S. Patent     Dec. 2, 1997     5,692,863
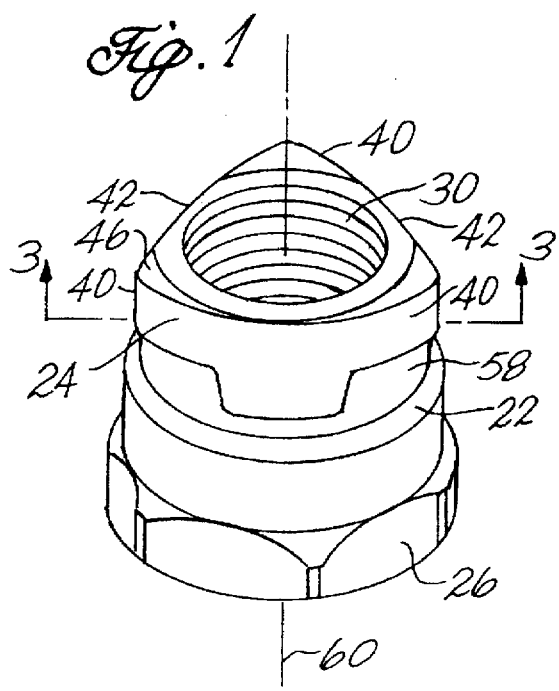
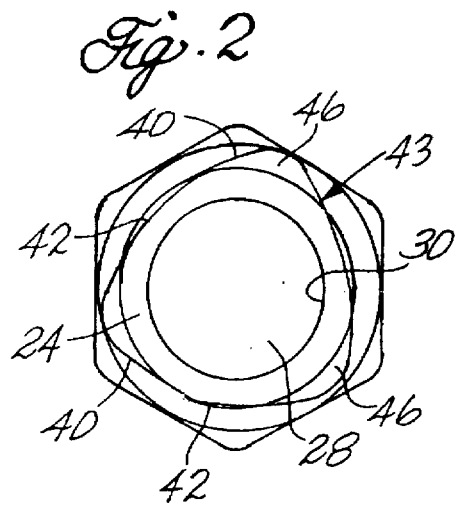
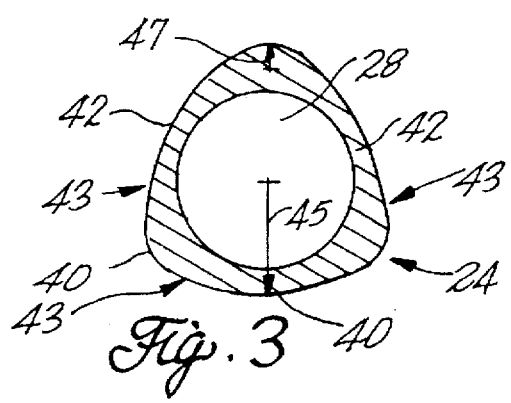
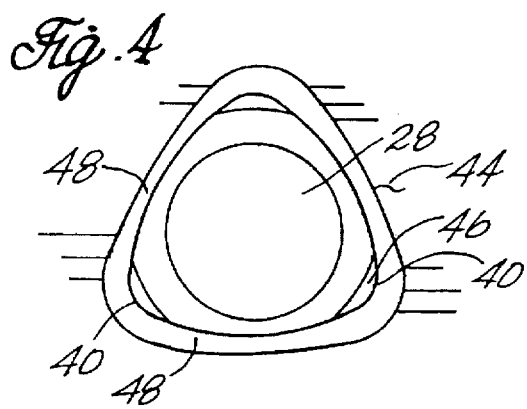
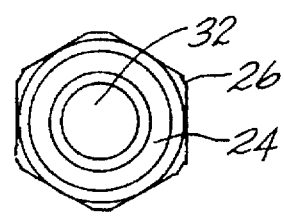
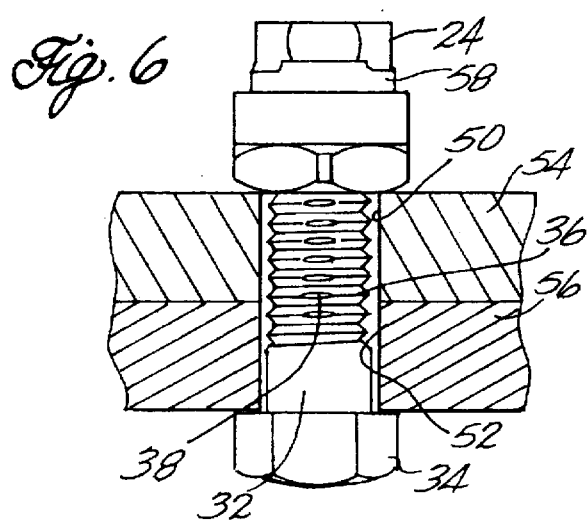

SELF-LOCKING PRELOAD CONTROLLING NUT

BACKGROUND OF THE INVENTION

This invention relates to self-locking fasteners providing predetermined axial loads.

Threaded fasteners consist of an internally threaded member or nut and an externally threaded member or bolt. The nut has an internal thread that threads onto an external thread on the bolt. Surfaces of the nut and bolt are formed to receive wrenches or other tightening mechanisms. Turning the wrenches transmits torque to the fasteners to form a joint where the fasteners hold one or more workpieces tightly together. Another name for a bolt is a threaded pin, and a nut is sometimes referred to as a collar.

Many environments in which fasteners are used require that the fasteners have extremely high integrity and strength. Use in vehicles and bridges are examples of such environments. Fasteners must often bear loads not only along their longitudinal axis, but radially of the axis. More particularly, when fasteners join together two or more workpieces and the workpieces are loaded in their planes with different loads, one workpiece tends to slide over the other. Fasteners passing through both workpieces become loaded in shear during their resistance to this type of loading.

Fasteners quite often must respond well in environments where they are cyclically stressed under conditions that could give rise to fatigue failure. A fastener with adequate axial load on it tends to resist fatigue failure and failure in shear. Axial loads arise by the clamping of workpieces between a head of the bolt on one side of the workpieces and the nut on the other side of the workpieces.

Because adequate axial loads help fasteners resist failure, it is desirable to know the clamping or axial load the fastener applies to a structure. Axial load correlates to the resistance of a nut to further tightening onto a bolt and against the workpieces. As the axial force increases, the resistance to further tightening increases, and the torque required to turn the nut increases. This fact has been used in fasteners to develop a predetermined axial load.

A desirable feature of a fastener is that it does not come apart in service. Various locking devices exist that keep nuts and bolts together. One deforms the thread of the nut so that it bears in radial compression against the thread of the bolt. The resistance to unthreading in this lock is purely frictional. The thread is commonly deformed at the factory in preference to the field, but field deformation has also been practiced. This type of thread lock is known as a prevailing torque thread lock.

U.S. Pat. No. 4,260,005 to Edgar Stencel, the disclosure of which is fully incorporated herein by reference, discloses a self-locking nut that uses external lobes to accept a deltoid driver having a generally triangular or deltoid shaped socket to tighten the nut on a cooperating bolt or pin. The nut is preferably used with a bolt having axially extending flutes in the thread.

Once a predetermined axial load exists in the joint being made, the lobes plastically deform and the driver can no longer turn the nut. Deformation of the lobes displaces material positioned radially inward from them into the flutes of the cooperating bolt to produce a thread lock. The thread lock results from material deforming into and across the bolt flutes. After lobe deformation material of the nut is in the flutes of the bolt, a mechanical or interference, thread lock exists. Lobe deformation is a function of setting torque applied through the driver.

It is desirable to obtain higher axial loads with larger fasteners for applications in trucks, buses, railroad cars, sky scrapers, bridges and other industrial applications. It is also desirable to provide higher torsional resistance in the lobes prior to failure, to produce higher axial loads needed for large industrial fasteners. Further, it is desirable to modify the shape and maintain ease of manufacture of the nuts while maintaining tolerances especially on a small scale basis.

Further, it is desirable that, as the deltoid driver deforms the lobes, the lobes do not fold over thereby preventing cracking around the lobe. Folding can occur where there is a sudden reduction in wall thickness on either side of the lobe, and folding over can promote cracking around the lobe.

Thus, increasing the axial load that can be applied by the fasteners, eliminating cracking in the nut, simplifying manufacture, and increasing the flexibility of the shape and size of the nut are desirable to broaden the applications in which the fasteners can be used and to improve the function of the fasteners.

BRIEF SUMMARY OF THE INVENTION

There is, therefore, provided in the practice of this invention a new and useful nut comprising a body with a threaded inner surface. The body has a locking section surrounding at least part of the threaded inner surface. The locking section has a smaller wall thickness and a larger wall thickness adjacent to the smaller wall thickness, and there is a gradual change of thickness between the two different thicknesses. This precludes a drastic change in thickness. The larger wall thickness forms a tightening surface adapted to be engaged by a driver. When a predetermined axial load is reached while tightening the nut onto a bolt, the driver deforms the larger wall thickness integrating it into the body of the nut. After the larger wall thickness is deformed, the driver rotates freely on the nut so that the nut cannot be further tightened.

In a preferred embodiment of the invention the locking section is deltoid shaped and the tightening surface is adapted to engage a deltoid driver. A relief groove is interposed between the locking section and the remainder of the barrel to prevent the larger wall thickness from deforming non-uniformly along its length. In this embodiment the locking section is located at one end of the nut and a second tightening surface adapted to engage a conventional wrench is located at the other end.

There is further provided in the practice of this invention a new and novel self-locking fastener assembly comprising a bolt and a nut. The bolt has an externally threaded surface and means at one end for engagement with a wrenching tool. The body of the nut has a threaded inner surface defining a bore for threadably receiving the bolt. The nut body also has a barrel portion with a locking section surrounding at least a portion of the threaded inner surface. The locking section has a smaller wall thickness and an adjacent larger wall thickness with a gradual change of thickness therebetween. The larger wall thickness forms a tightening surface adapted to engage a driver and to deform radially inward when the nut is tightened on the bolt against a work piece to a predetermined axial load. When the nut deforms, the larger wall thickness substantially integrates into the nut body eliminating the tightening surface, thereby terminating tightening of the nut on the bolt and impinging on the bolt to lock the fastener assembly.

In a preferred embodiment, the bolt comprises a plurality of circumferentially spaced flutes extending axially across the externally threaded surface of the bolt. When the nut deforms, material from the nut is forced into the flutes creating an interference lock.

There is still further provided in the practice of this invention a new and useful self-locking fastener and driver combination comprising a bolt, nut, and driver. The bolt is externally threaded at one end and has a means for engagement with a wrenching tool. A plurality of flutes extend across the threaded portion of the bolt in an axially direction. The nut has a threaded bore for engaging the threaded portion of the bolt in an external locking section opposite the threaded bore. The locking section has a deltoid shape comprising three protrusions and wall portions between the protrusions. The driver is sized to receive the locking section and leave a relief gap between an inner surface of the deltoid driver and an outer surface of the locking section. The driver engages the locking section to tighten the nut onto the bolt. In a preferred embodiment, the driver comprises a deltoid shape.

These and other features and advantages of the present invention will appear from the following Detailed Description and the accompanying drawings in which similar reference characters denote similar elements throughout the several views.

BRIEF DESCRIPTION OF THE DRAWINGS

FIG. 1 is an enlarged perspective view of a nut according to the present invention;

FIG. 2 is an enlarged top view of the nut of FIG. 1;

FIG. 3 is an enlarged cross-sectional view of a locking section of the nut of FIG. 1 taken along line 3—3;

FIG. 4 is an enlarged top partial view of the nut of FIG. 1 with a driver placed over the nut illustrating the relief gap;

FIG. 5 is a top view of the nut of FIG. 1 after the nut has been tightened onto a bolt by the driver; and FIG. 6 is a side view of the nut and bolt of FIG. 4 tightened onto a workpiece.

DETAILED DESCRIPTION

FIGS. 1 and 2 show a self-locking nut. The body of the nut comprises a barrel 22 having a locking section 24. The locking section is preferably positioned at an end of the nut remote from the workpiece to be engaged by the nut. A conventional hexagonal wrenching section 26 is provided adjacent to the barrel at the other end of the nut. A cylindrical bore 28 passes centrally through the nut, and the inner surface 30 of the nut defining the bore is threaded. The internal thread is adapted to receive a threaded bolt 32 having a head 34 and a threaded portion 36 which has flutes 38 extending across the threads in the axial direction (FIG. 6). The head provides means to receive a wrench, or the fastener may have a hex socket for an Allen wrench or may have a Phillips screwdriver socket. Also, the socket may be in the same end as the thread. As the nut is tightened onto the bolt against a workpiece such as a pair of sheets (FIG. 6), the axial load applied between the bolt head and the nut increases up to a predetermined load. When the predetermined load is reached, the locking section deforms into the flutes, rotationally locking the nut onto the bolt. Collapse of the locking section prevents the nut from being further tightened onto the bolt.

Referring additionally to FIG. 3, the preferred locking section 24 has a plurality of circumferentially spaced protrusions 40 which are connected by a plurality of walls 42. In the preferred embodiment shown, there are three equally spaced protrusions. The protrusions have a larger wall thickness which is greater than the smaller thickness of the walls which are adjacent thereto. Though the protrusions and the walls have different thicknesses, the thin walls gradually increase in thickness toward the protrusions, and the thick protrusions gradually decrease in thickness toward the walls. Therefore, the intersections, generally designated 43, between the walls and the protrusions are tangential, and thus, the intersections are smooth, without corners, notches, or other concave regions and without drastic changes in thickness. Further, the thicknesses of the walls do not change along the longitudinal axis 60 of the nut.

In the preferred embodiment shown, there are three protrusions and three walls which form the deltoid shaped locking section. Thus, the transverse cross section (FIG. 3) of the locking section is deltoid in shape. The deltoid shape is generally the shape of a triangle with arcuate sides. The deltoid shape forms a tightening or wrenching surface which is adapted to be engaged by an approximately complimentary driver 44. To aid engagement of the nut by the driver, each protrusion has a chamfer 46. The chamfer provides an angled surface for the driver to slide over.

Further, each of the walls has a radius of curvature illustrated by line 45, and each protrusion also has a radius of curvature illustrated by line 47. The radii of curvature of the walls and the radii of curvature of the protrusions intersect each other tangentially, so that as stated, the intersections 43 between the protrusions and the walls are smooth and without corners or concave regions. By selecting the size of the wall radii, the desired minimum wall thickness to promote locking while preventing the nut from sticking in the driver is obtained.

The driver 44 shown in FIG. 4 is deltoid shaped and is thus approximately complimentary in shape to the locking section of the nut. Further, the driver is sized and the wall radii chosen so that there is a small relief gap 48 between the inner wall of the driver and the outer wall of the locking section. The relief gap is best seen when the midpoints of the driver walls are aligned with the thin wall portions of the locking section. During deformation of the locking section, the thin wall portions of the locking section tend to deform outwardly. The relief gap provides a space into which the thin walled portions of the nut can deform outwardly without contacting the driver. Thus, the deformed thin walled portions do not interfere with removal of the driver from the nut. To increase the space between the inner wall of the driver and the outer wall of the locking section, alternative shapes of drivers, such as a conventional hexagonal shaped driver, could be used. Referring to FIGS. 5 and 6, to complete a joint with the disclosed nut and bolt, the bolt is inserted through holes 50, 52 in a pair of workpieces 54, 56, and the nut is threaded onto the bolt with the conventional wrenching end toward the head of the bolt and the workpieces as shown in FIG. 6. The deltoid driver is placed over the nut and used to tighten the workpieces between the nut and the bolt head. When the predetermined axial load is reached, the protrusions fail. As they fail, the driver plastically deforms the protrusions, forcing the material making up the protrusions inwardly on the nut and integrating the protrusions into the locking section, so that the protrusions are almost indistinguishable from the remainder of the locking section. Thus, the driver deforms the outer circumference of the locking section 24 from the deltoid shape shown in FIG. 2 to the generally circular shape shown in FIG. 5. As stated, the bolt preferably has a plurality of flutes 38 extending axially across the threads of the bolt into which the material is deformed. The deformation of material into the flutes creates an interference lock.

The barrel of the nut body also includes a circumferential relief groove 58. The relief groove comprises a circumferential groove having a sufficient depth to axially separate the locking section and hence the protrusions from the rest of the barrel. Thus, the protrusions are axially separated from nut material that would prevent the protrusions from failing uniformly along their length which extends parallel to a longitudinal axis 60 of the nut. The diameter of the relief groove is greater than the diameter of the thin wall sections.

The deltoid driver now rotates freely on the nut, and therefore, the driver cannot further tighten the nut. The material forced inwardly impinges on the thread of the bolt and into the flutes locking the nut from rotation relative to the bolt. The thin wall portions expand outwardly into the relief gap without impinging on the driver, and thus, the driver is easily removed from the nut.

The protrusions determine the axial load applied to a joint made with the nut because the protrusions fail at a predetermined load. The load can be determined by the resistance of the locking section to deformation. One convenient way to adjust the value of the load is to adjust the size of the protrusion and consequently the length of the wall between the protrusions. Further, the length of the protrusions along the longitudinal axis 60 of the nut can be increased, thereby increasing the axial load applied by the fastener.

Because of the smooth transition between the protrusions and the walls, the protrusions deform inwardly into the nut with little or no folding. Thus, no cracking occurs during tightening. The extra material in the protrusions and walls requires a high torque to deform the protrusions. Thus, the axial load applied by the fastener is increased over the axial load obtained by the prior art. Further, the deltoid shape is simple. It has no corners or complex contours. Therefore, it is easily manufactured, and the design is easily modified.

Thus, a self-locking nut is disclosed which utilizes smooth transitions between a plurality of protrusions and a plurality of walls to prevent cracking, apply high axial loads, and provide a simple nut design that is easily modified. While embodiments and applications of this invention have been shown and described, it would be apparent to those skilled in the art that many more modifications are possible without departing from the inventive concepts herein. It is, therefore, to be understood that within the scope of the appended claims, this invention may be practiced otherwise than as specifically described.

What is claimed is:

1. A self-locking nut comprising:
   a body having a threaded inner surface defining a bore therethrough;
   the body having a barrel portion with a deltoid shaped locking section surrounding at least part of the threaded inner surface;
   the deltoid shaped locking section having a smaller wall thickness, an adjacent larger wall thickness, and a gradual change of thickness therebetween; and
   the larger wall thickness forming a tightening surface adapted to engage a deltoid driver and deform radially inward when the nut is tightened on a thread to a predetermined axial load, so that upon such deformation the larger wall thickness substantially integrates into the body of the nut eliminating the tightening surface and terminating tightening of the nut.

2. The self-locking nut of claim 1 wherein the deltoid shaped locking section is substantially triangular with arcuate sides.

3. The self-locking nut according to claim 1 wherein the smaller wall thickness is constant along a longitudinal axis of the locking section.

4. The self-locking nut according to claim 1 wherein the larger wall thickness is adapted to plastically deform.

5. The self-locking nut according to claim 1 wherein the body further comprises a second tightening surface adapted to engage a conventional wrench.

6. The self-locking nut according to claim 1 wherein the body further comprises a relief groove axially separating the locking section from the remainder of the barrel.

7. The self-locking nut according to claim 1 wherein the body further comprises a relief groove axially separating the larger wall thickness from the remainder of the barrel.

8. The self-locking nut according to claim 1 wherein the body comprises an end, and the locking section is located at the end.

9. A self-locking nut comprising:
   a body having a threaded inner surface defining a bore therethrough for receiving a bolt;
   the body having a barrel portion surrounding at least part of the threaded inner surface;
   the barrel portion having a plurality of circumferentially spaced protrusions forming a deltoid shape connected by a plurality of walls with smooth transitions between the protrusions and the walls; and
   the protrusions forming a tightening surface adapted to engage a deltoid driver for deforming radially inward when the nut is tightened on a thread to a predetermined axial load.

10. The self-locking nut of claim 9 wherein the deltoid shaped protrusions are substantially triangular with arcuate sides.

11. The self-locking nut according to claim 9 wherein the circumferentially spaced protrusions are connected in a circumferential direction by the walls.

12. The self-locking nut according to claim 9 wherein the protrusions are adapted to plastically deform.

13. A self-locking nut comprising:
   a body having a threaded inner surface defining a centrally located bore therethrough for receiving a bolt;
   the body having a barrel portion with a deltoid shaped locking section surrounding at least part of the threaded inner surface;
   the deltoid shaped locking section having a plurality of wall radii and a plurality of protrusion radii;
   the protrusion radii forming a tightening surface adapted to engage an approximately complementary deltoid driver; and
   a plurality of tangential intersections between the protrusion radii and the wall radii.

14. The self-locking nut according to claim 12 wherein the body further comprises a relief groove axially separating the protrusion radii from the remainder of the barrel.

15. The self-looking nut of claim 13 wherein the deltoid shaped locking section is substantially triangular with arcuate sides.

16. A self-locking fastener assembly comprising:
   a bolt having an external threaded surface and means at one end for engagement with a wrenching tool;
   a nut body having a threaded inner surface defining a bore therethrough for threadably receiving the bolt;
   the body having a barrel portion with a deltoid shaped locking section surrounding at least part of the threaded inner surface;
   the deltoid shaped locking section having a smaller wall thickness, an adjacent larger wall thickness, and a gradual change of thickness therebetween; and the larger wall thickness forming a tightening surface adapted to engage a deltoid driver and deform radially inward when the nut is tightened on the bolt against a workpiece to a predetermined axial load, upon such deformation the larger wall thickness substantially integrates into the nut body eliminating the tightening surface thereby terminating tightening of the nut on the bolt, and impinging on the bolt to lock the fastener assembly.

17. The fastener assembly according to claim 16 wherein the bolt comprises a plurality of circumferentially spaced flutes on the externally threaded surface into which the nut deforms locking the fastener assembly.

18. The self-locking fastener of claim 16 wherein the deltoid shaped locking section is substantially triangular with arcuate sides.

19. The self-locking nut according to claim 16 wherein the body further comprises a relief groove axially separating the larger wall thickness from the remainder of the barrel.

20. A self-locking fastener comprising:

a bolt having an external threaded surface portion adjacent one end and means for engagement with a wrenching tool;

a plurality of flutes extending in an axial direction across the threaded portion of the bolt;

a nut having a threaded bore for engaging the threaded portion of the bolt and an external wrenching surface surrounding the threaded bore, the wrenching surface having a deltoid external transverse cross section comprising three protrusions and wall portions between the protrusions with a smaller wall thickness than the wall thickness adjacent the protrusions, the entire external surface having no concave regions between the protrusions and adjacent wall portions.

21. A self-locking fastener and driver combination comprising:

a bolt having an external threaded surface portion adjacent one end, means for engagement with a wrenching tool, and a plurality of flutes extending across the threaded portion of the bolt;

a nut having a threaded bore for engaging the threaded portion of the bolt and an external locking section opposite the threaded bore, the locking section having a deltoid shape comprising three protrusions and wall portions between the protrusions; and a driver sized to receive the locking section with a relief gap between an inner surface of the deltoid driver and an outer surface of the locking section.

22. The combination of claim 21 wherein the driver comprises a deltoid shape.

23. The combination of claim 21 wherein the flutes extend axially across the threaded portion of the bolt.

24. The combination of claim 21 wherein the nut further comprises a relief groove axially separating the protrusions from the nut body.

* * * * *

UNITED STATES PATENT AND TRADEMARK OFFICE
CERTIFICATE OF CORRECTION

PATENT NO. : 5,692,863
DATED : December 2, 1997
INVENTOR(S) : John A. Louw

It is certified that error appears in the above-indentified patent and that said Letters Patent is hereby corrected as shown below:

Column 6, line 53, change "self-looking" to -- self-locking --.

Signed and Sealed this

Sixteenth Day of February, 1999

Attest:

*Acting Commissioner of Patents and Trademarks*

*Attesting Officer*